(12) United States Patent
Ashida et al.

(10) Patent No.: US 6,892,208 B2
(45) Date of Patent: May 10, 2005

(54) METHOD AND SYSTEM FOR DATABASE MANAGEMENT FOR DATA MINING

(75) Inventors: Hitoshi Ashida, Kawasaki (JP); Toyohisa Morita, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 481 days.

(21) Appl. No.: 09/994,951

(22) Filed: Nov. 27, 2001

(65) Prior Publication Data

US 2002/0087540 A1 Jul. 4, 2002

(30) Foreign Application Priority Data

Dec. 20, 2000 (JP) ........................................ 2000-391834

(51) Int. Cl.[7] ............................................. G06F 17/30
(52) U.S. Cl. ........................... 707/102; 707/2; 707/100
(58) Field of Search ........................... 707/1, 2, 4, 100, 707/101, 102

(56) References Cited

U.S. PATENT DOCUMENTS

| | | | | |
|---|---|---|---|---|
| 6,122,636 | A | * | 9/2000 | Malloy et al. ............... 707/102 |
| 6,567,796 | B1 | * | 5/2003 | Yost et al. ...................... 707/2 |
| 6,658,393 | B1 | * | 12/2003 | Basch et al. ................... 705/38 |
| 6,671,680 | B1 | * | 12/2003 | Iwamoto et al. ................ 707/3 |
| 6,691,120 | B1 | * | 2/2004 | Durrant et al. ............. 707/100 |

OTHER PUBLICATIONS

Michael J. A. Berry and Gordon Linoff; 1997; Data Mining Techniques For Marketing Sales, and Customer Support; Overview of Data MIning Techniques; pp. 119–123.

Hitoshi Ashida and Toyohisa Morita; 1999; 1999 IEEE International Conference on Systems, Man, and Cybernetics; Human Communication and Cybernetics; pp. V–882—V–88.

Toyohisa Morita, Yoshinori Satou, Erika Ayukawa, and Akira Maeda; 2000; Information and Knowledge Management in the 21st Century; INFORMS–KORMS Seoul 2000 Conference; Customer Relationship Management Through Data Mining; parts 1–6.

* cited by examiner

*Primary Examiner*—Greta Robinson
*Assistant Examiner*—Cheryl Lewis
(74) *Attorney, Agent, or Firm*—Knoble Yoshida & Dunleavy

(57) ABSTRACT

Customer data is displayed to a user for making decisions in dealing with customers. The displayed data is generated based upon characteristic rules that are generated with respect to predetermined data definition information on the customer data. After confirming the effect of adding or deleting certain conditions to and from characteristic data segments as specified by the characteristic rules, the user selects a segment of particular interest. Subsequently, the user specifies certain similar customers from the selected segment to be used for speculation based upon a speculation model so that the speculation model has a relatively high precision level. Additionally, the user modifies the conditions on the speculation results to further understand the bases for the inclusion of the customers in the speculation. The user considers the future course of action towards certain customers based upon the above understandings.

18 Claims, 9 Drawing Sheets

| MONTH | CUSTOMER ID | GENDER | AGE | · · · | PROFIT AMOUNT | CANCELLED CUSTOMERS |
|---|---|---|---|---|---|---|
| 3 | 00001 | M | 27 | · · · | 32,000 | 0 |
|   | 00002 | F | 22 | · · · | 35,000 | 1 |
|   | 00003 | M | 31 | · · · | 27,000 | 0 |
|   | . | . | . | . | . | . |
| 4 | 00001 | M | 27 | · · · | 34,000 |  |
|   | 00002 | F | 22 | · · · | 38,000 |  |
|   | 00003 | M | 31 | · · · | 28,000 |  |
|   | . | . | . | . | . | . |
| 5 | 00001 | M | 27 | · · · | 36,000 |  |
|   | 00003 | M | 31 | · · · | 29,000 |  |
|   | . | . | . | . | . | . |

FIG.2

[USED DATA]
MARCH

[RULE GENERATION ITEMS]
CONDITION ITEMS :
    GENDER, AGE, PROFIT AMOUNT,
    PRODUCT MODEL, RESIDENCE
CONCLUSION ITEMS : CANCELLATION STATUS
[LAYER]
GENDER :
   MALE
   FEMALE
AGE :
UNDER 20 : AGE < 20
20~24 : 19 < AGE < 25
25~29 : 24 < AGE < 30
30~34 : 29 < AGE < 35
OVER 35 : 34 < AGE

FIG.3

| NO. | RULE | RULE/CONDITION | PRECISION |
|---|---|---|---|
| 1 | IF AGE = 20~24 & GENDER = F THEN LICENSE = CANCEL | 54/200 | 27% |
| 2 | IF PRODUCT MODEL = xyz & RETAIL STORE = A THEN LICENSE = CANCEL | 42/210 | 20% |
| : | : | : | : |

FIG.4

| ANALYSIS ITEM CANCELLATION % ▽ | PROFIT AMOUNT $300 - $400 ▽ | RETAIL STORE ALL ▽ | |
|---|---|---|---|
| AGE \ GENDER | MALE | FEMALE | UNKNOWN |
| UNDER 19 | 7 | 15 | 4 |
| 20~24 | 16 | 24 | 6 |
| 25~34 | 9 | 9 | SELECT COSTOMER LIST |
| 35~44 | 8 | 3 | GENERATE SPECULATION MODEL |
| OVER 45 | 3 | 2 | SPECULATE |

[DATA]
MARCH

[RULE GENERATION ITEMS]
CONDITION ITEMS : OCCUPATION, PROFIT AMOUNT,
          CANCELLATION, RESIDENCE
CONCLUSION ITEMS :

[SEGMENT CONDITIONS]
AGE = 20~24 & GENDER = FEMALE
& PROFIT AMOUNT =$300 - $400

FIG.9

| CUSTOMER ID | CANCELLED CUSTOMER | SELECTION CONDITIONS | AGE | PROFIT AMOUNT | ... |
|---|---|---|---|---|---|
| 00036 | 1.0 | AGE = 20~24 & GENDER =FEMALE & PROFIT AMOUNT =$300 - $400 | 21 | $320 | ... |
| 00302 | 1.0 | AGE = 20~24 & GENDER =FEMALE & PROFIT AMOUNT =$300 - $400 | 22 | $350 | ... |
| 00421 | 0.98 | AGE = 20~24 & GENDER =FEMALE & PROFIT AMOUNT =$300 - $400 | 20 | $330 | ... |
| ⋮ | | | | | |

FIG.10

METHOD AND SYSTEM FOR DATABASE MANAGEMENT FOR DATA MINING

FIELD OF THE INVENTION

The current invention is generally related to a database analysis technology, and more particularly related to the generation of a customer list based upon a certain predetermined purpose using a speculation model.

BACKGROUND OF THE INVENTION

In the recent years, magnetic cards and IC cards have been widely used in combination with computer equipment. With the above cards, customer databases have been developed and maintained in various industries such as department stores, specialty boutiques, consumer electronics retailers and super markets. The above databases include customer characteristic information such as names and addresses as well as other information such as accumulated purchase data. Similarly, transactions are maintained in the databases for the financial industry while data called call detail data are maintained in the databases for the telecommunication industry. For example, the call detail data include a caller number, a recipient number and call duration for each call. Based upon the above described databases, one exemplary service is Customer Relationship Management (CRM) for providing quality service.

Another exemplary use of the above described databases is data mining that semi-automatically extracts certain information by analyzing a large volume of database data. In particular, data mining includes rule induction, Memory Based Reasoning (MBR), OnLine Analytical Processing (OLAP), and the these exemplary data mining methods are disclosed in "Data Mining Techniques For Marketing, Sales and Customer Support," pp. 120–123, John Wiley & Sons, Inc (1997). Rule induction generally extracts certain information from the database by specifying predetermined rules such as a condition, if and then. One exemplary induction rule is disclosed in "Proceedings of 1999 IEEE International Conference on Systems, Man, and Cybernetics," p.V.-882–886. For one example of MBR, as disclosed in the above "Data Mining Techniques For Marketing, Sales and Customer Support" at p. 120, a certain future event is evaluated based upon similar to a known event in the database. For example, the occurrence of the future event is quantified based upon the known similar event or the future event is classified based upon the known similar event. Finally, for OLAP, as disclosed in the above "Data Mining Techniques For Marketing, Sales and Customer Support" at p. 123, a significant pattern in the data is explored, and the result is displayed based upon a multidimensional database. By combining the induction rule and OLAP techniques, one way to improve the precision of the MBR-based prediction is disclosed in "Customer Relationship Management Through Data Mining," Proceedings of Informs Seoul, P1956–1963, (2001).

In the above described combination of prior art, the last exemplary prior art is designed to predict or speculate on a certain segment of the data based upon a predetermined rule. However, in the last exemplary prior art, a user is not able to specify an additional rule and or to delete any existing rules based upon his or her opinion or other circumstances. The user is not able to ascertain certain characteristics of the segment such as a number of customers. For the above reasons, it is desired that a user specifies an additional rule and or to delete any existing rules based upon his or her opinion or other circumstances to ascertain certain characteristics of the data segment. It is also desired to display or identify any user-specified conditions on the results.

SUMMARY OF THE INVENTION

In order to solve the above and other problems, according to a first aspect of the current invention, a method of database management, including the steps of: generating characteristic rules based upon data definition information and data, the data definition information including items specifying analysis and conditions; generating a multidimensional database based upon the characteristic rules, the data and the data definition information, the multidimensional database being organized based upon conclusion items and condition items of the characteristic rules, the conclusion items specifying an analysis dimension, the condition items specifying a key dimension; selecting one of the characteristic rules; displaying a portion of the multidimensional database that is corresponding to the selected one of the characteristic rules, the displayed portion being organized in rows and columns to define cells based upon the condition items of the selected one of the characteristic rules, the cells each having a value for the analysis dimension; modifying the condition items; displaying another portion of the multidimensional database that is corresponding to the modified condition items; extracting a selected segment and a speculation data list from the data based upon the modified condition items and the selected one of the characteristic rules, the selected segment specifying conditions for selecting the speculation data list; generating a speculation model base upon the data, the selected segment and the speculation data list; and outputting speculation results based upon the speculation model and the speculation data list.

According to a second aspect of the current invention, a system for database management, including: a data storage unit for storing information for storing data definition information, data; a characteristic rule generation unit connected to the data storage unit for generating characteristic rules based upon the data definition information and the data, the data definition information including items specifying analysis and conditions, the characteristic rules being stored in the data storage unit; a segment selection unit connected to the data storage unit for generating a multidimensional database based upon the characteristic rules, the data and the data definition information, the multidimensional database being organized based upon conclusion items and condition items of the characteristic rules, the conclusion items specifying an analysis dimension, the condition items specifying a key dimension, the multidimensional database being stored in the data storage unit; a user interface unit connected to the data storage unit for selecting one of the characteristic rules and for modifying the condition items; a processing unit connected to the storage unit and the user interface unit for outputting to the storage unit a first portion of the multidimensional database that is corresponding to the selected one of the characteristic rules, the first portion being organized in rows and columns to define cells based upon the condition items of the selected one of the characteristic rules, the cells each having a value for the analysis dimension, the processing unit also outputting a second portion of the multidimensional database that is corresponding to the modified condition items; a displaying unit connected to the processing unit and the storage unit for displaying the first portion of the multidimensional database and the second portion of the multidimensional database; and a speculation processing unit connected to the storage unit and the processing unit for extracting a selected segment and a speculation data list from the data based upon the modified condition items and the selected one of the characteristic rules, the selected segment specifying conditions for selecting the speculation data list, the speculation processing unit generating a speculation model base upon the data, the selected segment and the speculation data list, the speculation processing unit outputting speculation results based upon the speculation model and the speculation data list.

According to a third aspect of the current invention, a storage medium for storing computer executable instructions for managing a database, the computer executable instructions performing the steps of: generating characteristic rules based upon data definition information and data, the data definition information including items specifying analysis and conditions; generating a multidimensional database based upon the characteristic rules, the data and the data definition information, the multidimensional database being organized based upon conclusion items and condition items of the characteristic rules, the conclusion items specifying an analysis dimension, the condition items specifying a key dimension; selecting one of the characteristic rules; displaying a portion of the multidimensional database that is corresponding to the selected one of the characteristic rules, the displayed portion being organized in rows and columns to define cells based upon the condition items of the selected one of the characteristic rules, the cells each having a value for the analysis dimension; modifying the condition items; displaying another portion of the multidimensional database that is corresponding to the modified condition items; extracting a selected segment and a speculation data list from the data based upon the modified condition items and the selected one of the characteristic rules, the selected segment specifying conditions for selecting the speculation data list; generating a speculation model base upon the data, the selected segment and the speculation data list; and outputting speculation results based upon the speculation model and the speculation data list.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 2 is a table illustrating one example of the customer data used in the current invention.

FIG. 3 is a diagram illustrating one example of the data definition information used in the current invention.

FIG. 4 is a table illustrating one example of the characteristic rule sets used in the current invention.

FIG. 9 is a diagram illustrating exemplary results of the selected speculation model 110 according to the current invention.

FIG. 10 is a diagram illustrating one example of the speculation result according to the current invention.

DETAILED DESCRIPTION OF THE PREFERRED EMBODIMENT(S)

Figure 1:
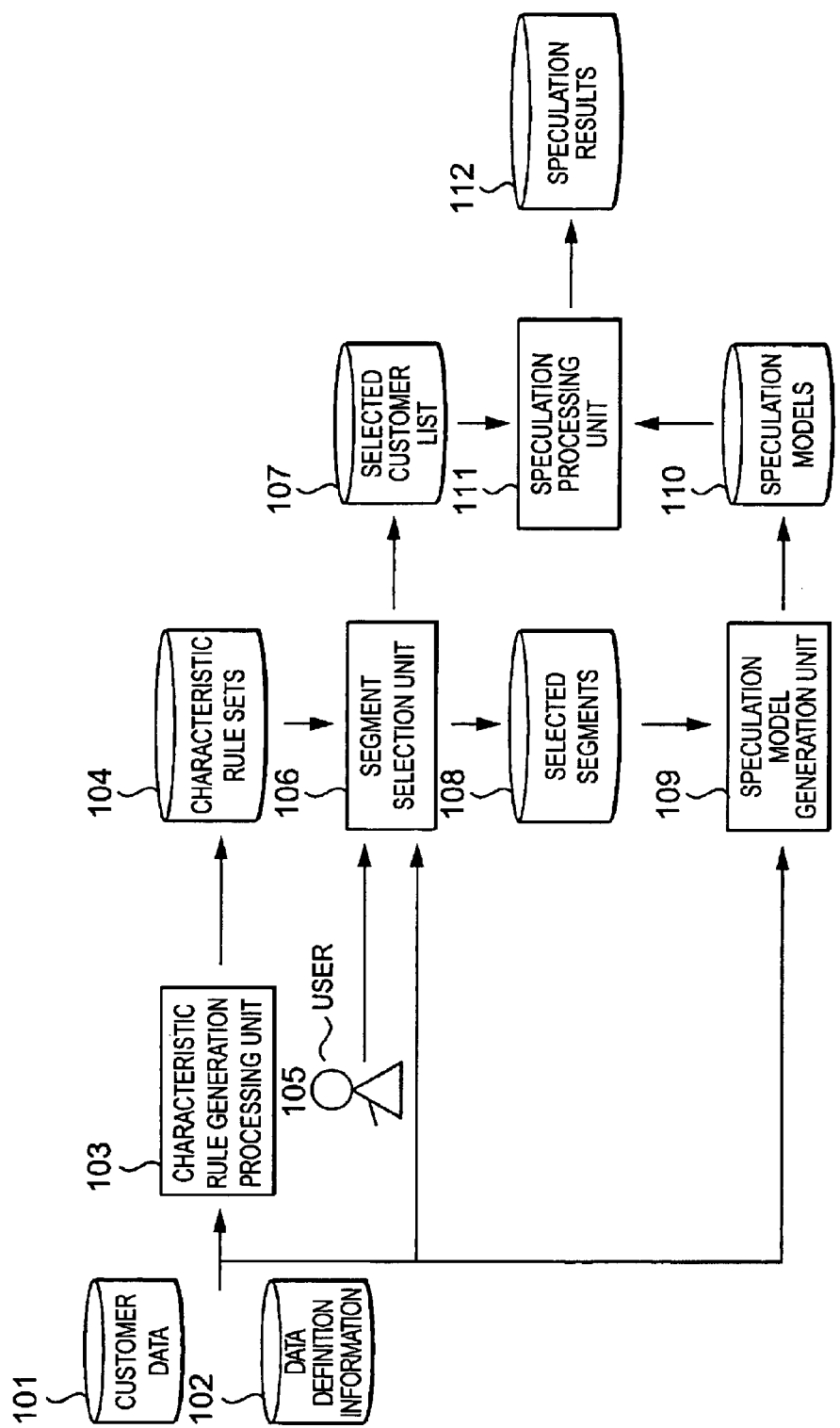
FIG. 1 is a diagram illustrating one preferred embodiment of the system for generating speculation results according to the current invention.

Referring now to the drawings, wherein like reference numerals designate corresponding structures throughout the views, and referring in particular to FIG. 1, one preferred embodiment of the system for generating speculation results according to the current invention includes a characteristic rule generation processing unit 103, a segment selection unit 106, a speculation model generation unit 109 and a speculation processing unit 111. In general, customer data 101 and data definition information 102 are inputted into the characteristic rule generation processing unit 103, and the characteristic rule generation processing unit 103 outputs characteristic rule sets 104. Based upon the customer data 101, the data definition information 102, the characteristic rule sets 104 and user-defined data 105, the segment selection unit 106 outputs speculation data lists or selected customer lists 107 and selected segments 108. Subsequently, based upon the customer data 101, the data definition information 102 and the selected segment 108, the speculation model generation unit 109 generates speculation models 110. Finally, based upon the selected customer lists 107 and the speculation models 110, the speculation processing unit 111 generates speculation results 112.

Still referring to FIG. 1, each of the above processing units processes information in a predetermined sequence and manner. According to a predetermined rule such as in an if-then format, the characteristic rule generation processing unit 103 extracts certain characteristic information to generate the characteristic rules 104 based upon the customer data 101, which includes at least one record each of which contains at least record entries. After the characteristic rules 104 are generated by the characteristic rule generation processing unit 103, the segment selection unit 106 determines the structure of the multi-dimensional database based upon the data definition information 102. The condition items in the data definition information 102 correspond to the key dimensions in the multi-dimensional database while the conclusion items correspond to the analysis dimensions. After the dimensional structure is determined, the characteristic rule generation processing unit 103 loads the customer data 101 and generates the multi-dimensional database. In other words, the above segment selection process includes two types of tasks. One task is to generate multi-dimensional database using the condition items as columns and rows, and the conclusion items as analysis results. The other task is to output the selected customer list with the selected segment data into the above created multidimensional cells. A user is now involved to select one of the condition items in the characteristic rules 104. In response to the above user selection, a display screen is generated to display cell values as the conclusion items in the columns and rows which specify, the condition items.

One example of the customer data 101 is illustrated in FIG. 2. The exemplary customer data 101 is generally organized by the month, including March, April and May. Within each month, the first column is a customer number or ID to identify a customer, and for each identified customer, a record including information on predetermined items such as gender, age, profit amount and cancellation status. Within March, the cancellation status reflects an event between the beginning and the end of March. On the other hand, information other than the cancellation status for the March records is based upon the information at the end of January. For example, the customer having ID=00002 has cancelled the continuous activity or subscription during the month of March as indicated by "1" in the cancelled customers column. Similarly, data in April and May have the above described time frame. Because of the non-cancellation information of the customer having ID=0002 from March, the April record contains the customer information for ID=0002. However, every one of the April record lacks the information on the cancellation status. Furthermore, in the May record, the customer information for ID=0002 is no longer included based upon the above two-month rule. Based upon the above exemplary data in April, June data will not be constructed.

Now referring to FIG. 3, one example of the data definition information 102 is illustrated. The data definition information 102 is used for generating the characteristic rule sets 104, for selecting the selected customer list 107 and for generating speculation models 110. The items used in generating the characteristic rule sets 104 include conditions items such as gender, age, profit amount, product model and residence. The above rule generation items in generating the characteristic rule sets 104 also include conclusion items such as cancellation customers. In the characteristic rule generation processing unit 103, the condition items include an "IF" portion of the IF-THEN rule while the conclusion items include a "THEN" portion. Under the layer structure, gender and age are used, and under gender and age, there are a number of member classifications. Gender has male and female member classifications while age has five age categories or member classifications. A combination of the above condition items and the above member classifications of the layer structure defines a speculated segment that is a portion of data to be speculated. In the above example, the speculated segment is a portion of the customer data that is defined by the above described combined conditions. For example, the speculated segment is expressed by age=20~24 & gender=female & profit amount=$300~$400. One rule generation technique is disclosed in "Proceedings of 1999 IEEE International Conference on Systems, Man, and Cybernetics," p.V.-882–886.

Now referring to FIG. 4, one example of the characteristic rule sets 104 is illustrated based upon the customer 101 in the March data. A first column includes entry items such as numbers while the rest of the columns each includes one rule. A rule sentence in the second column is written in the "if . . . then" format. For example, if the age is between twenty and twenty-four and the gender is female, license is cancelled. A rule/condition in the third column is a ratio between a number of records to satisfy the rule and a number of records to satisfy only the condition portion of the rule 200 people satisfy the rule portion while 50 people satisfy both the rule and condition portions. A precision level in the fourth column is a ratio between the number of records satisfying the rule and the number of records satisfying the condition.

Figures 5, 6:
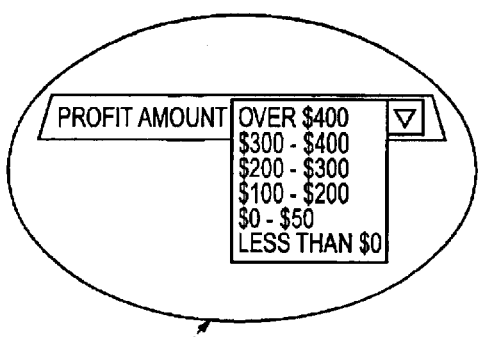
FIG. 5 is a diagram illustrating an exemplary multidimensional display according to the current invention.
FIG. 6 is a diagram illustrating one exemplary display screen certain conditions are modified in one preferred embodiment of the system according to the current invention.

Now referring to FIG. 5, an exemplary multidimensional display is illustrated. In this example, the above rule No. 1 is selected in FIG. 4. The selected rule is that if the age is between twenty and twenty-four and the gender is female, license is cancelled. Based upon the above selected rule, a multidimensional display screen displays condition items as well as conclusion items, and the multidimensional display includes rows for displaying age groups and columns for displaying gender. In each cell, the above ratio between the number of cancelled customers for the rule and a total number of customer is displayed as a conclusion item. The above ratio value is automatically calculated by the system according to the current invention. The cells that meet the conditions used in the selected rule are in a certain predetermined color in order to distinguish at a first glance from other conditions that are not used in the rule. Other conditions are displayed as pages of the multidimensional database.

Still referring to FIG. 5, the display is modifiable. A user compares the cell values of particular interest under the selected conditions to other cell values in order to determine the validity or significance of the selected rule. Furthermore, the user constructs other displays or speculation models and selects a segment to be used for the speculation models by observing cell value changes after adding and deleting the conditions. The addition and deletion of the conditions are generally based upon the user's opinion and experience or even upon trials and errors. The conditions are changed by multidimensional database functions such as drill up, drill down, slice and dice. In adding a condition, one way is to drill down a page of the multi-dimensional database and to select a slice. In deleting a condition, either a column or a row of a page in the multi-dimensional database is drilled up. For example, the user moves a pointing device such as a mouse on a triangle or an area indicating "ALL" in the profit amount and clicks the right mouse button on the mouse to drill down to display drill down selection items such as "over $400," "$300–$400," "$200–$300," "$100–$200," "$50–$100, " "$0–$50"and "less than $0." A new condition is added by selecting a slice or a menu selection item of $300–$400 with the left mouse button to replace the currently selected all amounts. After a combination of the conditions is modified, the system of according to the current invention immediately displays the recalculated results based upon the changes.

Now referring to FIG. 6, one exemplary display screen illustrates immediately calculated results after certain conditions are modified in one preferred embodiment of the system according to the current invention. In the above exemplary change in conditions, the user has added a new condition by drilling down the profit amount to select a slice of $300–$400 from the currently selected all amounts. After the above addition of a new condition, the user has observed that the cell value of particular interest such as female between twenty years old and twenty-four years old has changed from 27% to 24%. In comparison to other cell values such as 16% for the counter part males of between twenty years old and twenty-four years old and 9% for females between twenty-five years old and thirty-four years old, the above 24% figure is still too high for cancellation. The above percentage figure in each cell is converted into a number of customers by changing the analysis item. Based upon the percentage figure and the customer numbers, the user constructs speculation models to determine whether or not the segment is worthwhile for predictions. An example of deleting a condition in the above example to restore the profit amount to the originally selected all-amount condition. As described above, the user focuses upon a certain cell after he or she adds or deletes conditions to see the cell values in the certain cells and cells around the certain cells.

Still referring to FIG. 6, after the user added the condition on the profit amount of $300–$400 in combination with the existing conditions of age=20 through 24 and the gender=female, the above conditions determine the selected segment 108 as shown in FIG. 1. Using a pointing device such as a mouse, a particular cell is selected as a target cell for speculation. Furthermore, a set of predetermined functions is also displayed for the selected cell when the user initiates the menu. For example, the menu display is initiated by a right mouse button while the cell is selected by a left mouse button. Within the function menu, the user selects a desired function by the left mouse button.

Assuming that the user selects the selected customer list generation in the function menu and the March data is currently being displayed, the selected customer list 107 is selected from the customer data 101 from May or two months after the current data and only from a portion that satisfies the imposed conditions 108. The month for the above analysis is automatically selected to be two months after the currently selected month. As described above with respect to FIG. 2, certain portions of the data other than a specified data such as the cancellation status are automatically taken from two months earlier. Next, assuming that the user selects the speculation mode generation in the function menu, the speculation model generation unit 109 automatically generates an optimal speculation model based upon the conditions that the user has selected for the above described segment selection process or unit 106. Lastly, assuming that the user selects the speculation in the function menu, the speculation processing unit 111 automatically concludes the speculation results 112 based upon the selected customer list 107 and the speculation models 110. The speculation algorithm is substantially the same as the algorithm used for speculating the potential cancelled customers or possibility for the cancelled customers. The speculation algorithms include the prior art techniques that have been disclosed in the background section of the current application. The speculation item in the function menu remains disabled until the selected customer list 107 and the speculation models 110 have been selected and successfully completed.

Figure 7:
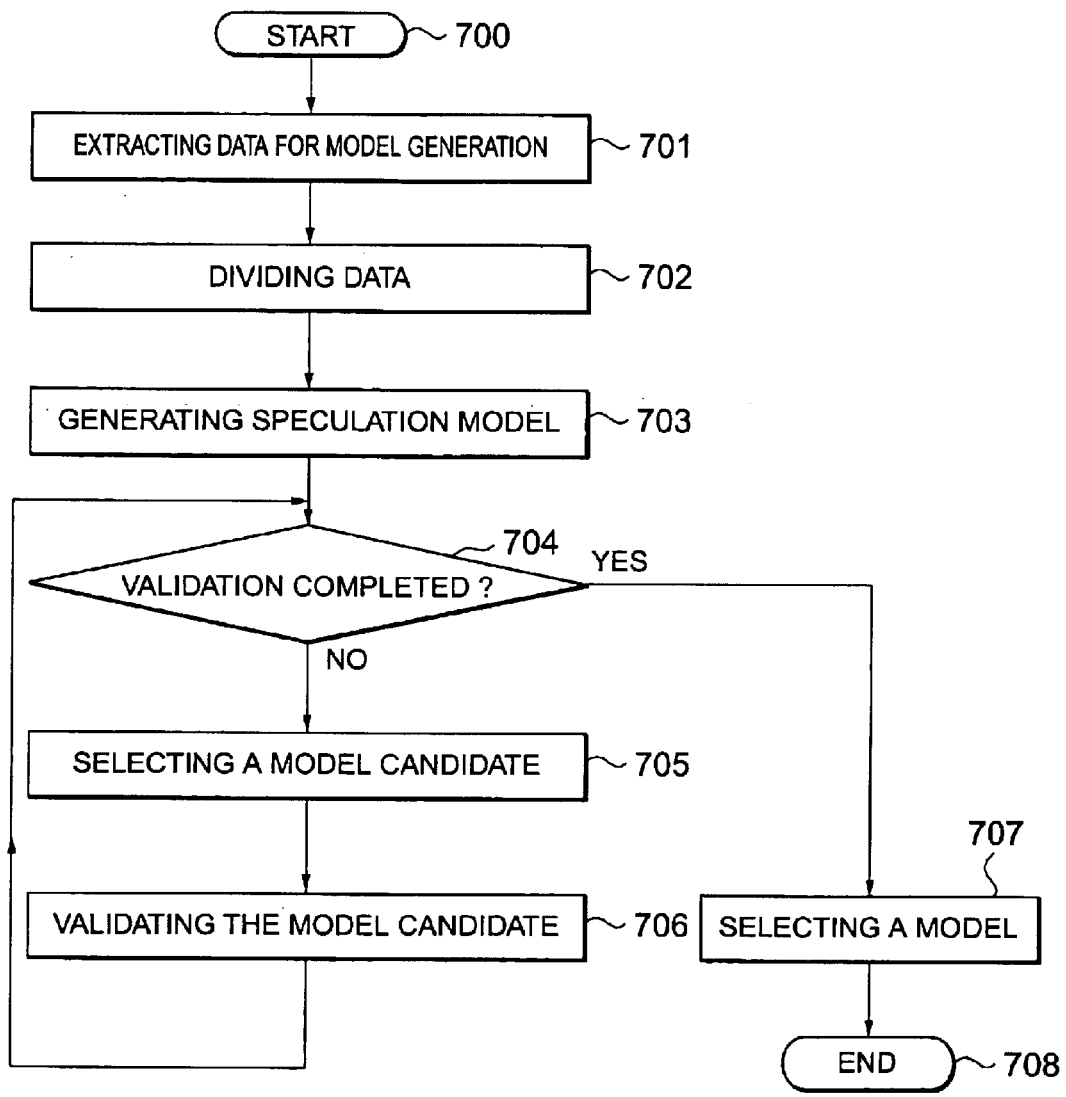
FIG. 7 is a flow chart illustrating steps involved in a preferred process of the speculation model generation/selection according to the current invention.

Now referring to FIG. 7, a flow chart illustrates steps involved in a preferred processes of the speculation model generation/selection according to the current invention. The steps are described with respect to the units and the data as shown in FIG. 1. In a step 701, a portion of the customer data 101 is selected according to the data definition information 102. In the step 701, the selected portion is further refined to extract records that satisfy the conditions as set forth in the selected segments 108. In a step 702, the extracted records in the step 701 are divided into model candidate data and validating data. For example, the division is accomplished by randomly sampling sixty percent of the records as the model candidate data while the remaining forty percent as the validation data. After the division in the step 702, the conditions as defined in the data definition information 102 are comprehensively combined to generate in combination with the conclusion items in a step 703. For example, the above generated combinations of the conditions include a) gender & age; b) gender & profit amount and c) gender & age & profit amount. Based upon the above combined conditions as inputs and the conclusion items of the data definition information 102 as outputs, speculation models are generated in the step 703. In a step 704, it is determined whether or not each of the above generated speculation models in the step 703 has been already verified in a verification step 706. If it is determined in the step 704, the model has not been already validated, a model candidate selection process is performed in a step 705. In the model candidate selection step 705, an unverified model is selected for verification. In the verification step 706, only data corresponding to the items in the model selected in the step 705 is extracted from the model candidate data from the division step 702. Based upon the above extracted data, the memory based reasoning (MBR) model is constructed in the step 706. Finally, for each of the records in the validation data that has been generated in the division step 702, speculation is performed in the verification step 706. On the other hand, if it is determined in the step 704 that the model has been already validated, the preferred process proceeds to a step 707 where a model selection takes place. Based upon the mean square error comparison, the speculation model with the least mean square error value is selected in the model selection step 707, and the preferred process terminates in a step 708.

Figure 8:
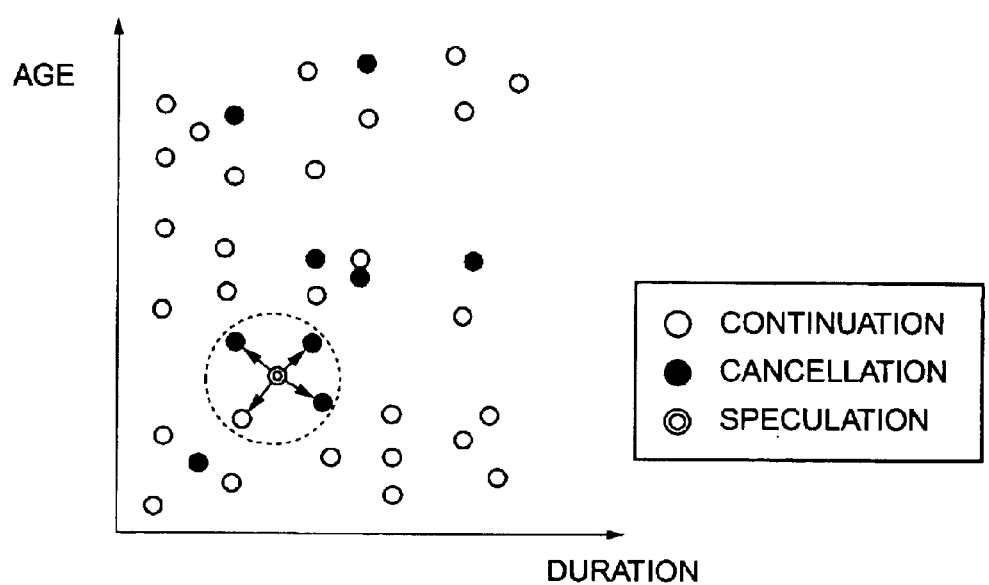
FIG. 8 is a diagram illustrating exemplary speculation results that are obtained by one preferred process according to the current invention.

Now referring to FIG. 8, a diagram illustrates exemplary speculation results that are obtained by the step 706 of the preferred process according to the current invention. A point in the graph is marked by a double-circle to indicate a piece of data that has been speculated by the above described process. Four points in the graph are each marked by a single circle with in a dotted circle to indicate four pieces of data that are adjacent to the above speculated data point. Among the four adjacent data records, three records represent cancelled customer No. 1 while one record represents cancelled customer No. 0. Based upon the above results, the probability for cancellation by the customer No. 1 is ¾ or 75%. Similarly, the cancellation probability is speculated for each customer in the verification data. To evaluate the speculation models, the mean square error is determined for each model based upon the verification data and the actual customer cancellation data. Based upon the mean square error comparison, the speculation model with the least mean square error value is selected in the model selection step 707.

Now referring to FIG. 9, exemplary results of the selected speculation model 110 are illustrated in a diagram. The used data is data that is used for speculation while the used speculation items are items that are used as condition items and conclusion items for speculation. The segment condition is a set of conditions that are to be satisfied by the records for the speculation model. In the above example, March data from the customer data 101 is used for speculation. In the same example, the condition items include occupation, profit amount and residence while the conclusion items include cancelled customers. The segment conditions include that age=20~24, gender=female and profit amount=$300~$400.

Now referring to FIG. 10, one example of the speculation results 112 is illustrated in a diagram. The exemplary speculation results 112 generally include a speculation value for a cancelled customer ID number and selection conditions such as segment conditions for a speculation model. The segment condition values from the segment model 110 are substituted in the selection conditions. It is optional to include other customer characteristics such as age and profit amount from the selected customer list. For example, a second row is a record for the customer ID=00036 and its customer cancellation probability is 100% or 1.0. The same customer has become a part of the selected data for speculation since she met the following conditions that age is between 20 and 24, gender is female and the profit amount is between $300 and $400. In fact, the customer is a twenty-one year-old female who generated a profit amount of $320. As described above, the selection condition column is one of the patentable features of the current invention. Based upon the above selection conditions or reasons for selecting a particular customer for speculation, the user determines a course of action for the particular customer. In an alternative embodiment, instead of executing the speculation process 111 after each of the selected segment process 106, more than one segment is selected at a time, and the speculation process 111 speculates to generate the results collectively based upon the above plurality of the selected segments.

Figure 11:
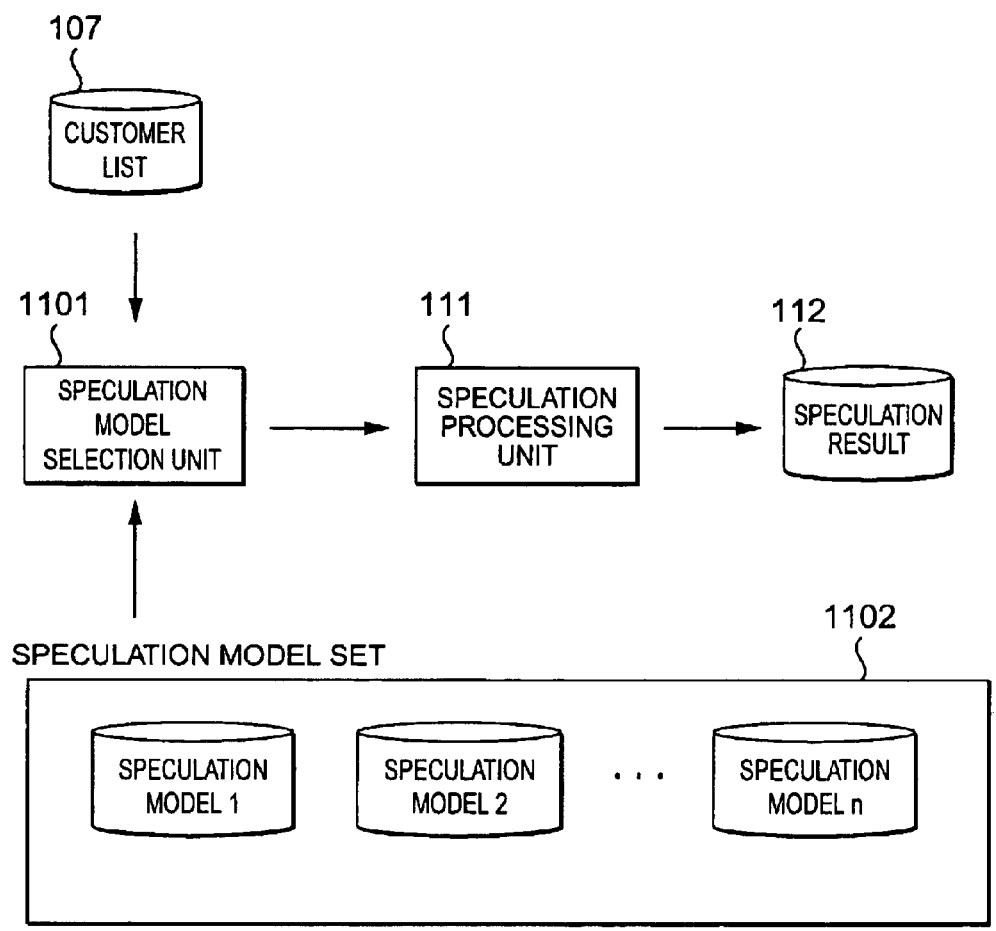
FIG. 11 is a diagram illustrating a flow of one example of the collective speculation process with one preferred embodiment according to the current invention.

Now referring to FIG. 11, one example of the collective speculation processes is illustrated in a flow diagram. The selected customer list 107 includes all the customers that are included in any one of a plurality of the selected segments. Although not shown in FIG. 11, the rule generation items in the data definition information 102 are all included. A speculation model selection process or unit 1101 selects one record at a time from the selected customer list 107 and also selects one speculation model from a speculation model set 1102 for each of the above selected record. The speculation model set 1102 is a collection of more than one speculation model 110 that has been generated in advance based upon the selection segment 108. The speculation model selection process or unit 1101 determines whether or not the selected record meets the segment conditions of each of the speculation models in the speculation model set 1102. The speculation model selection process or unit 1101 inputs any one of the speculation models that meet the segment conditions into a speculation process or unit 111. The speculation process or unit 111 outputs the speculation results 112. The format of the speculation results 112 is illustrated in FIG. 10, and the selection conditions may vary for each record. In one preferred embodiment, the above described steps or flows are associated with a single command from a user rather than separate commands as shown in the function menu items as shown in FIG. 6.

Figure 12:
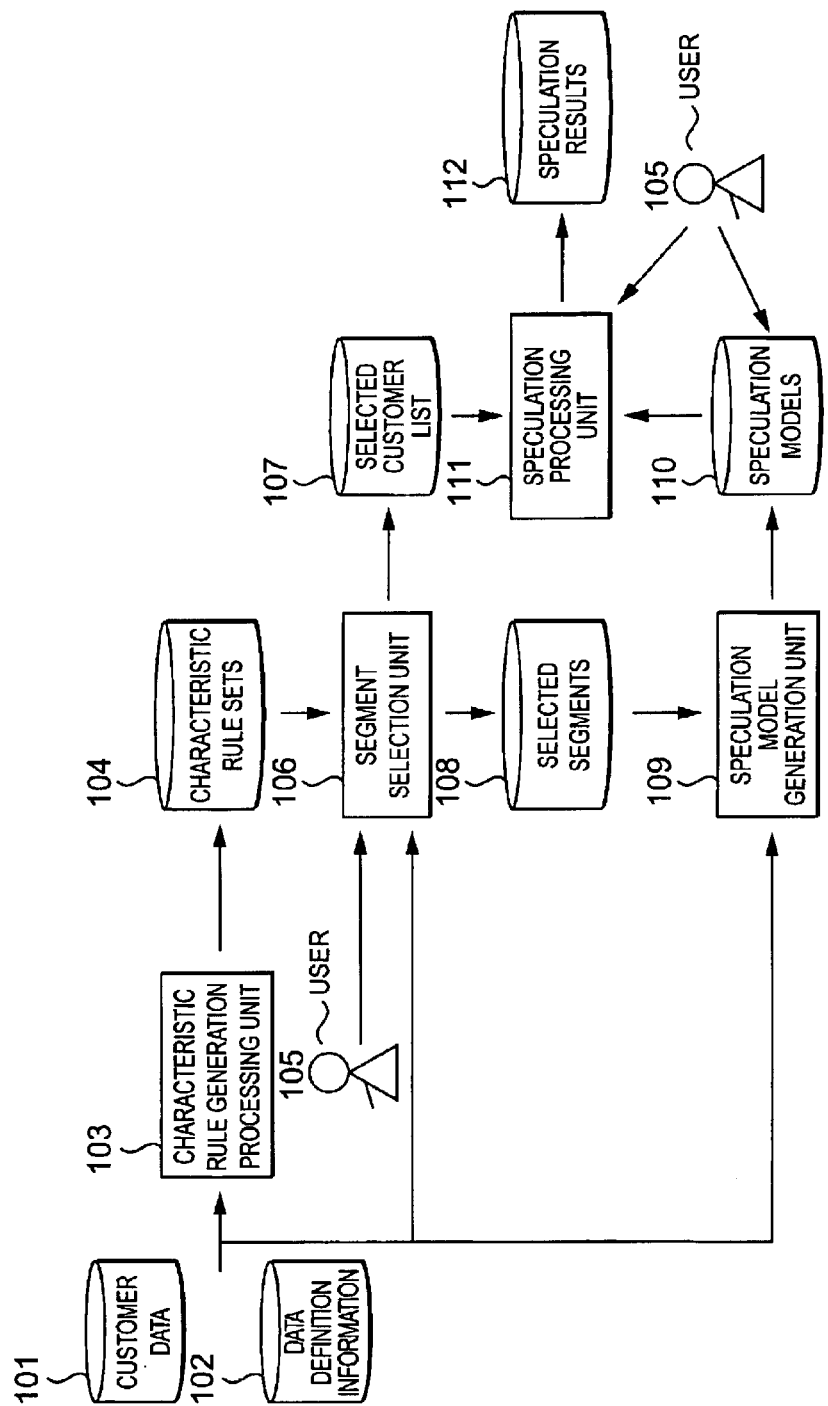
FIG. 12 is a diagram illustrating another preferred embodiment of the system for generating speculation results according to the current invention.

Now referring to FIG. 12, another preferred embodiment of the system for generating speculation results according to the current invention includes a characteristic rule generation processing unit 103, a segment selection unit 106, a speculation model generation unit 109 and a speculation processing unit 111. In general, customer data 101 and data definition information 102 are inputted into the characteristic rule generation processing unit 103, and the characteristic rule generation processing unit 103 outputs characteristic rule sets 104. Based upon the customer data 101, the data definition information 102, the characteristic rule sets 104 and user-defined data 105, the segment selection unit 106 outputs speculation data lists or selected customer lists 107 and selected segments 108. In the second preferred embodiment, based upon the customer data 101, the data definition information 102 and the selected segment 108, the speculation model generation unit 109 generates a predetermined number of speculation models 110 in advance and store them before the user selects a particular speculation model for use. In the second preferred embodiment, the user 105 independently selects one of the speculation models 110. Finally, based upon the selected customer lists 107 and the user selected speculation model 110, the speculation processing unit 111 generates speculation results 112.

In summary, in the above described preferred embodiments of the data mining system according to the current invention, after confirming the effect of adding or deleting conditions to and from characteristic data segments as specified by the characteristic rules, the user selects a segment of particular interest. Subsequently, the user specifies certain similar customers from the selected segment to be used for speculation so that the speculation model has a relatively high precision level. Additionally, the user modifies the conditions on the speculation results to further understand the bases for the inclusion of the customers in the speculation. The user considers the future course of action towards certain customers based upon the above understandings.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of database management, comprising the steps of:
   generating characteristic rules based upon data definition information and data, the data definition information including items specifying analysis and conditions;
   generating a multidimensional database based upon the characteristic rules, the data and the data definition information, the multidimensional database being organized based upon conclusion items and condition items of the characteristic rules, the conclusion items specifying an analysis dimension, the condition items specifying a key dimension;
   selecting one of the characteristic rules via a predetermined user-interface;
   displaying a portion of the multidimensional database that is corresponding to the selected one of the characteristic rules, the displayed portion being organized in rows and columns to define cells based upon the condition items of the selected one of the characteristic rules, the cells each having a value for the analysis dimension;
   modifying the condition items through the predetermined user-interface;
   displaying another portion of the multidimensional database that is corresponding to the modified condition items through the predetermined user-interface;
   extracting a selected segment and a speculation data list from the data based upon the modified condition items and the selected one of the characteristic rules, the selected segment specifying conditions for selecting the speculation data list;
   generating a speculation model base upon the data, the selected segment and the speculation data list; and
   outputting speculation results based upon the speculation model and the speculation data list.

2. The method of database management according to claim 1 wherein the data is customer data for maintaining a predetermined subscribed service while the analysis dimension is probability of cancellation of the predetermined subscribed service.

3. The method of database management according to claim 1 wherein said modifying the condition items is accomplished by displaying a predetermined set of the condition items in a pull-down menu and selecting one of the condition items by a pointing device.

4. The method of database management according to claim 1 wherein said generating the speculation model further including additional steps of:
dividing the speculation data list into candidate model data and verification data;
generating candidate speculation models based upon inputs as specified by combinations of the conditions in the data definition information and outputs as specified by the analysis in the data definition information;
verifying each of the candidate speculation models by extracting information from the candidate model data according to the candidate speculation model and speculating based upon the verification data;
evaluating the candidate speculation models based upon said verifying to generate evaluation values; and
selecting the speculation model from the candidate speculation models based upon the evaluation values.

5. The method of database management according to claim 4 wherein the evaluation values are mean square errors.

6. A method of database management, comprising the steps of:
generating characteristic rules based upon data definition information and data, the data definition information including items specifying analysis and conditions;
generating a multidimensional database based upon the characteristic rules, the data and the data definition information, the multidimensional database being organized bated upon conclusion items and condition items of the characteristic rules, the conclusion items specifying an analysis dimension, the condition items specifying a key dimension;
selecting one of the characteristic rules via a predetermined user-interface;
displaying a portion of the multidimensional database that is corresponding to the selected one of the characteristic rules through the predetermined user-interface, the displayed portion being organized in rows and columns to define cells based upon the condition items of the selected one of the characteristic rules, the cells each having a value for the analysis dimension;
modifying the condition items through the predetermined user-interface;
displaying another portion of the multidimensional database that is corresponding to the modified condition items through the predetermined user-interface;
extracting a selected segment and a speculation data list from the data based upon the modified condition items and the selected one of the characteristic rules, the selected segment specifying conditions for selecting the speculation data list;
generating a speculation model based upon the data, the selected segment and the speculation data list; and
outputting speculation results based upon the speculation model and the speculation data list, wherein the speculation results include the selected segment.

7. A system for data mining a database comprising:
a data storage unit for storing data definition information and data;
a characteristic rule generation unit connected to said data storage unit for generating characteristic rules based upon the data definition information and the data, the data definition information including items specifying analysis and conditions, the characteristic rules being stored in said data storage unit;
a segment selection unit connected to said data storage unit for generating a multidimensional database based upon the characteristic rules, the data and the data definition information, the multidimensional database being organized based upon conclusion items and condition items of the characteristic rules, the conclusion items specifying an analysis dimension, the condition items specifying a key dimension, the multidimensional database being stored in said data storage unit;
a user interface unit connected to said data storage unit for providing a predetermined user-interface for selecting one of the characteristic rules and for modifying the condition items;
a processing unit connected to said storage unit and said user interface unit for outputting to said storage unit a first portion of the multidimensional database that is corresponding to the selected one of the characteristic rules, the first portion being organized in rows and columns to define cells based upon the condition items of the selected one of the characteristic rules, the cells each having a value for the analysis dimension, said processing unit also outputting a second portion of the multidimensional database that is corresponding to the modified condition items;
a displaying unit connected to said user-interface unit, said processing unit and said storage unit for displaying the first portion of the multidimensional database and the second portion of the multidimensional database through the predetermined user-interface; and
a speculation processing unit connected to said storage unit and said processing unit for extracting a selected segment and a speculation data list from the data based upon the modified condition items and the selected one of the characteristic rules, the selected segment specifying conditions for selecting the speculation data list, said speculation processing unit generating a speculation model based upon the data, the selected segment and the speculation data list, said speculation processing unit outputting speculation results based upon the speculation model and the speculation data list.

8. The system for data mining a database according to claim 7 wherein the data is customer data for maintaining a predetermined subscribed service while the analysis dimension is probability of cancellation of the predetermined subscribed service.

9. The system for data mining a database according to claim 7 wherein said user interface unit modifying the condition items by displaying a predetermined set of the condition items in a pull-down menu and selecting one of the condition items by a pointing device.

10. The system for data mining a database according to claim 7 wherein said speculation processing unit further comprises:
a data dividing unit for dividing the speculation data list into candidate model data and verification data;
a candidate model generation unit for generating candidate speculation models based upon inputs as specified by combinations of the conditions in the data definition information and outputs as specified by the analysis in the data definition information; and
a verification unit for connected to said candidate model generation unit for verifying each of the candidate speculation models by extracting information from the candidate model data according to the candidate speculation model and speculating based upon the verification data, said verification unit evaluating the candidate speculation models based upon said verifying to generate evaluation values and selecting the speculation model from the candidate speculation models based upon the evaluation values.

11. The system for data mining a database according to claim 10 wherein the evaluation values are mean square errors.

12. A system for data mining a database comprising:

a data storage unit for storing data definition information and data;

a characteristic rule generation unit connected to said data storage unit for generating characteristic rules based upon the data definition information and the data, the data definition information including items specifying analysis and conditions, the characteristic rules being stored in said data storage unit;

a segment selection unit connected to said data storage unit for generating a multidimensional database based upon the characteristic rules, the data and the data definition information, the multidimensional database being organized based upon conclusion items and condition items of the characteristic rules, the conclusion items specifying an analysis dimension, the condition items specifying a key dimension, the multidimensional database being stored in said data storage unit;

a user interface unit connected to said data storage unit for providing a predetermined user-interface for selecting one of the characteristic rules and for modifying the condition items;

a processing unit connected to said storage unit and said user interface unit for outputting to said storage unit a first portion of the multidimensional database that is corresponding to the selected one of the characteristic rules, the first portion being organized in rows and columns to define cells based upon the condition items of the selected one of the characteristic rules, the cells each having a value for the analysis dimension, said processing unit also outputting a second portion of the multidimensional database that is corresponding to the modified condition items;

a displaying unit connected to said user interface unit, said processing unit and said storage unit for displaying the first portion of the multidimensional database and the second portion of the multidimensional database through the predetermined user-interface; and a speculation processing unit connected to said storage unit and said processing unit for extracting a selected segment and a speculation data list from the data based upon the modified condition items and the selected one of the characteristic rules, the selected segment specifying conditions for selecting the speculation data list, said speculation processing unit generating a speculation model based upon the data, the selected segment and the speculation data list, said speculation processing unit outputting speculation results based upon the speculation model and the speculation data list, wherein the speculation results include the selected segment.

13. A storage medium for storing computer executable instructions for managing a database, the computer executable instructions performing the steps of:

generating characteristic rules based upon data definition information and data, the data definition information including items specifying analysis and conditions;

generating a multidimensional database based upon the characteristic rules, the data and the data definition information, the multidimensional database being organized based upon conclusion items and condition items of the characteristic rules, the conclusion items specifying an analysis dimension, the condition items specifying a key dimension;

selecting one of the characteristic rules via a predetermined user-interface;

displaying a portion of the multidimensional database that is corresponding to the selected one of the characteristic rules through the predetermined user-interface, the displayed portion being organized in rows and columns to define cells based upon the condition items of the selected one of the characteristic rules, the cells each having a value for the analysis dimension;

modifying the condition items through the predetermined user-interface;

displaying another portion of the multidimensional database that is corresponding to the modified condition items through the predetermined user-interface;

extracting a selected segment and a speculation data list from the data based upon the modified condition items and the selected one of the characteristic rules, the selected segment specifying conditions for selecting the speculation data list;

generating a speculation model base upon the data, the selected segment and the speculation data list; and outputting speculation results based upon the speculation model and the speculation data list.

14. The storage medium for storing computer executable instructions according to claim 13 wherein the data is customer data for maintaining a predetermined subscribed service while the analysis dimension is probability of cancellation of the predetermined subscribed service.

15. The storage medium for storing computer executable instructions according to claim 13 wherein said modifying the condition items is accomplished by displaying a predetermined set of the condition items in a pull-down menu and selecting one of the condition items by a pointing device.

16. The storage medium for storing computer executable instructions according to claim 13 wherein said generating the speculation model further including additional steps of:

dividing the speculation data list into candidate model data and verification data;

generating candidate speculation models based upon inputs as specified by combinations of the conditions in the data definition information and outputs as specified by the analysis in the data definition information;

verifying each of the candidate speculation models by extracting information from the candidate model data according to the candidate speculation model and speculating based upon the verification data;

evaluating the candidate speculation models based upon said verifying to generate evaluation values; and selecting the speculation model from the candidate speculation models based upon the evaluation values.

17. The storage medium for storing computer executable instructions according to claim 16 wherein the evaluation values are mean square errors.

18. A storage medium for storing computer executable instructions for managing a database, the computer executable instructions performing the steps of:

generating characteristic rules based upon data definition information and data, the data definition information including items specifying analysis and conditions;

generating a multidimensional database based upon the characteristic rules, the data and the data definition information, the multidimensional database being organized bated upon conclusion items and condition items of the characteristic rules, the conclusion items specifying an analysis dimension, the condition items specifying a key dimension;

selecting one of the characteristic rules via a predetermined user-interface;

displaying a portion of the multidimensional database that is corresponding to the selected one of the characteristic rules through the predetermined user-interface, the displayed portion being organized in rows and columns to define cells based upon the condition items of the selected one of the characteristic rules, the cells each having a value for the analysis dimension;

modifying the condition items through the predetermined user-interface;

displaying another portion of the multidimensional database that is corresponding to the modified condition items through the predetermined user-interface;

extracting a selected segment and a speculation data list from the data based upon the modified condition items and the selected one of the characteristic rules, the selected segment specifying conditions for selecting the speculation data list;

generating a speculation model based upon the data, the selected segment and the speculation data list; and outputting speculation results based upon the speculation model and the speculation data list, wherein the speculation results include the selected segment.

* * * * *